United States Patent [19]
Matena
[11] 3,800,090
[45] Mar. 26, 1974

[54] COMMUNICATION AND TELEMETRY ARRANGEMENT

[75] Inventor: Philip Matena, Middletown, N.J.
[73] Assignee: Bell Telephone Laboratories, Incorporated, Murray Hill, N.J.

[22] Filed: July 27, 1972
[21] Appl. No.: 275,778

[52] U.S. Cl. .......... 179/2 A
[51] Int. Cl. .......... H04m 11/00
[58] Field of Search .......... 179/2 A

[56] References Cited
UNITED STATES PATENTS

| | | | |
|---|---|---|---|
| 3,588,357 | 6/1971 | Sellari | 179/2 A |
| 3,647,971 | 3/1972 | Cushman | 179/2 A |

*Primary Examiner*—Ralph D. Blakeslee
*Attorney, Agent, or Firm*—D. E. Nester

[57] ABSTRACT

A telemetry arrangement for selectively interrogating sensing devices attached to both telephone lines and dedicated lines. In compliance with control information from a data processor, a separate telemetry switching network, disassociated from a regular communication switching network, temporarily disconnects a designated line from the switching network and connects it to a monitoring circuit. This monitoring circuit receives telemetry data from a sensing device attached to the line and conveys this data to the data processor.

16 Claims, 3 Drawing Figures

COMMUNICATION AND TELEMETRY ARRANGEMENT

FIELD OF THE INVENTION

This invention concerns telemetry apparatus and more specifically, it concerns switching and control apparatus for establishing telemetry connections between monitoring circuits and lines having sensing devices attached thereto.

BACKGROUND OF THE INVENTION

The telephone network, in addition to conveying voice signals between subscriber stations, can also beneficially convey data signals between processing devices. Telemetry applications particularly lend themselves to utilization of the telephone network since this network is well suited for the conveyance of telemetry data.

Some arrangements have been devised in the past for conveying telemetry data via the lines and switching apparatus of the telephone network; however, these arrangements have been inflexible, costly, and under certain conditions may interfere with the normal provision of communication services to station sets served by these lines. In one prior arrangement, automatic dialing equipment associated with a sensing device in a subscriber's residence, initiated calls to a centralized processing center at predetermined time intervals. This arrangement deprived subscribers, served by the line with the attached sensing device, from placing or receiving calls during the period when the dialing equipment and sensing device were communicating with the processing center.

In another prior arrangement, the automatic dialing equipment was situated at the centralized processing center where it initiated calls to each monitoring device. This arrangement required not only continual rearrangement of wiring at the communication switching center but also required extensive bookkeeping to update records needed to keep track of the changing telephone numbers identifying the lines having attached sensing devices. Although a sensing device remained attached to the same physical line, a new telephone number was often required to access this line due to changes in the numbers assigned the station sets utilizing the line.

In still another prior arrangement, scanning apparatus in a communication switching network was modified to perform a telemetry function. This arrangement, while reducing the time required to establish a monitoring connection to a sensing device, was manifestly inefficient because of its predetermined nonselective scanning of all subscriber lines irrespective of whether these lines were associated with a sensing device.

It is an object of my invention to selectively and efficiently establish telemetry connections to sensing devices, while also minimizing interference with normal communication services.

SUMMARY OF THE INVENTION

In accordance with one illustrative embodiment of the principles of my invention, telemetry paths to lines connected to a communication switching network are provided via a separate telemetry switching network. This telemetry network, in response to physical line information from a data processor, ascertains if a designated line is being used for communication purposes. If the line is not in use, the telemetry network disconnects the line from the switching center and establishes a telemetry path from the line to a monitoring circuit. This monitoring circuit interrogates a sensing device attached to the line to obtain telemetry data. Upon completion of this interrogation, the telemetry network releases the telemetry path and reconnects the line to the communication network for the resumption of normal service.

This telemetry network has access to those lines in the communication network having an attached sensor. The telemetry network also has access to dedicated monitoring lines which do not have an appearance in the communication network.

In accordance with the principles of this invention, the gathering of telemetry data does not interfere with the normal communication services afforded the station sets served by the communication network.

The environment in which the illustrative embodiment of this invention is depicted relates to the monitoring of sensing devices associated with pressurized cable sheaths. These cables are pressurized so that if any breaks develop in the sheaths, the escaping gas prevents destructive moisture from entering the cables. In this embodiment, the monitored physical parameters are, for example, the actual pressure in a cable, the humidity of the pressurized gas, the flow of this gas and the status of the equipment maintaining the desired gas pressure within the sheath. The inventive concepts taught herein are applicable to any telemetry system irrespective of the physical parameters under surveillance.

In accordance with one feature of this invention, a switching network selectively accesses subscriber's lines and dedicated monitoring lines in response to line address information permanently and uniquely identifying a specific line. Changes in telephone numbers and line equipment location numbers temporarily associated with these lines for communication switching purposes do not affect the operation of this telemetry arrangement.

It is a further feature of my invention to access these lines via switch means which operate independently of a communication switching network upon which some of the lines are terminated.

It is still another feature of my invention to establish telemetry paths to these lines in any sequence and at any frequency desired to maximize the efficiency of the telemetering operation.

In accordance with another aspect of my invention, when communication lines are accessed by the telemetry equipment through the separate switch means, the communications lines are terminated in the telemetry equipment so as to appear idle to the communication network so that they may still be seized for normal communications purposes by the communication switching network.

GENERAL DESCRIPTION

Figure 1:
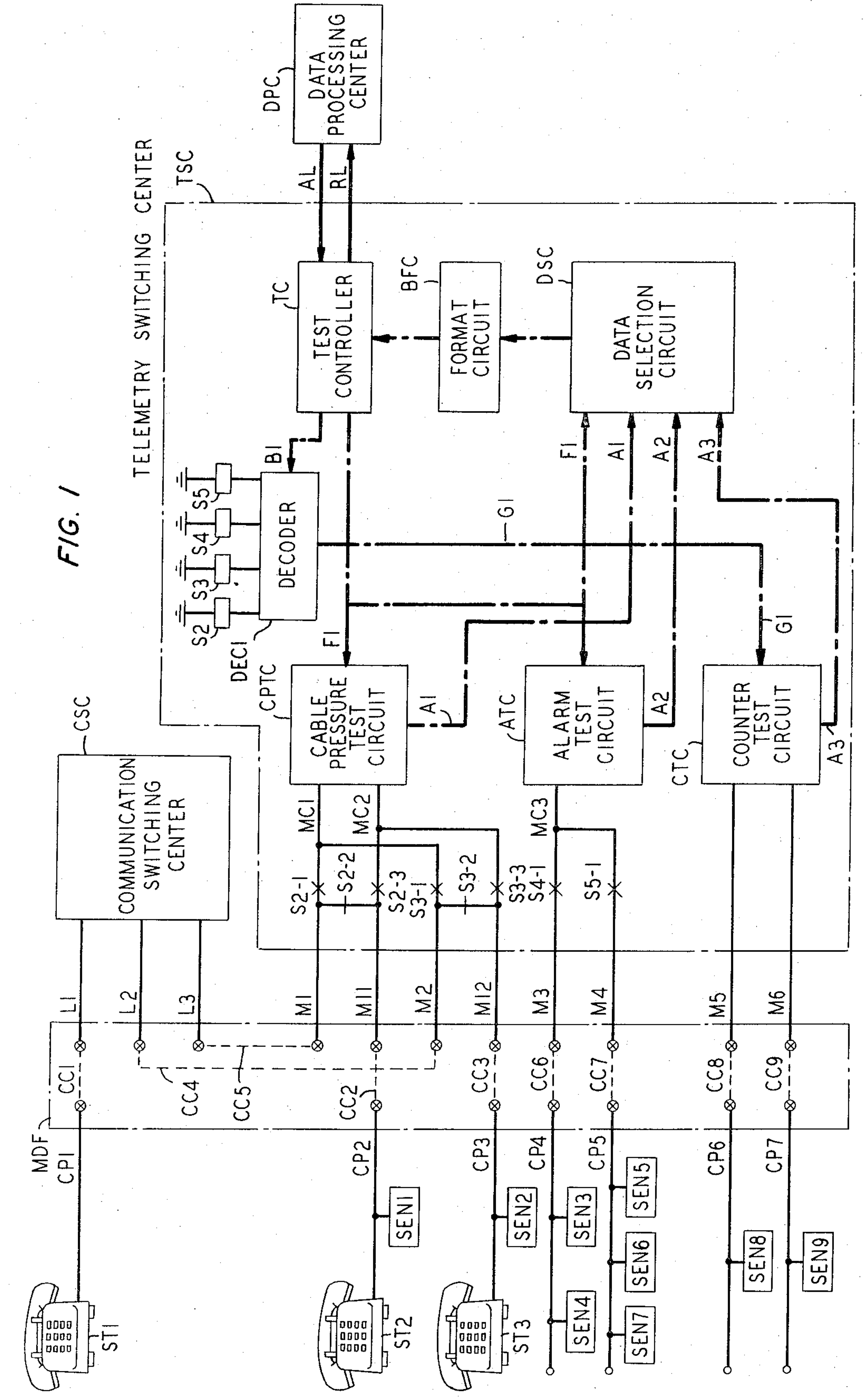
FIG. 1 is a block diagram of a telemetry system beneficially organized in accordance with the principles of my invention.

FIG. 1 is a block diagram depicting a telemetry and communication arrangement which beneficially operates in accordance with the principles of my invention. The dual functions of this arrangement are to provide communication service to station sets ST1-3, and to provide noninterfering telemetry access to sensors SEN1-9.

In an effort to simplify the description as much as possible consistent with the full disclosure of my invention, only three station sets and nine sensors have been illustrated. However, these station sets and sensors are merely representative of a larger plurality of the many functional types of such apparatus which would be serviced by an actual installation.

Communication switching center CSC provides individualized communication service to station sets ST1-3. In this illustrative embodiment these station sets are well-known telephone devices for receiving and transmitting data and voice signals. Moreover, in this embodiment, communication center CSC is a well-known telephone switching office which comprises means for establishing communication paths between the station sets which it serves, as well as for establishing other communication paths from these sets to remote communication centers not depicted in this figure. As is well known in the telephone art, these communication paths are established from a calling station to a called station in compliance with received station address information. The source of this information is typically the calling station and this information identifies the called station. Communication center CSC also comprises means for applying periodic alerting signals (e.g., ringing signals) to station sets ST1-3 to audibly inform subscribers that their station is being called.

Surveillance of sensors SEN1-9 is provided under the control and supervision of data processing center DPC and telemetry switching center TSC. In this illustrative embodiment, data center DPC comprises input-output apparatus and at least one processing unit for performing logical and arithmetic operations on data in accordance with stored program instructions. Data center DPC serves as the source of control information for telemetry center TSC as well as the depository for retrieved telemetry data from sensors SEN1-9.

Telemetry switching center TSC comprises control and switching means separate from communication center CSC. The function of telemetry center TSC is to establish telemetry connections to sensors SEN1-9 in response to control information received in the form of data words from data center DPC. Each of these data words specifies a physical line address and testing information. The physical line address uniquely and permanently identifies the specific line CP2-7 to which a telemetry path is to be established. The testing information specifies the type of interrogation to be performed over the identified line. The physical line address information is unaffected by changes in station telephone numbers and line equipment location numbers at communication center CSC. These station numbers and line equipment numbers are exclusively associated with communication center CSC and do not play a role in the operation of telemetry center TSC.

In response to a received data word, telemetry center TSC establishes a telemetry path to the line identified by the physical line address; and, in accordance with the testing information specified by the data word, it interrogates the sensor(s) connected to the line. The retrieved telemetry data is conveyed from telemetry center TSC to data center DPC which evaluates the data.

If the designated line is a working communication line, such as each of the lines terminating on terminals CP2-3, telemetry center TSC ascertains via a bypass path if the line is presently providing communication service to a station set before it interrogates the sensor attached thereto. If the line is busy, telemetry center TSC so informs data center DPC which will reattempt the interrogation at a future time. However, if the line is idle, telemetry center TSC disconnects the line from communication center CSC, terminates the line's appearance in communication center CSC on a circuit which simulates an idle communication line condition, and establishes a telemetry path from the line to a test circuit. This test circuit interrogates the sensor connected to the line in accordance with the testing information. Upon completion of this interrogation, telemetry center TSC releases the telemetry path from the test circuit to the line. The line then assumes its normal appearance on communication center CSC and the retrieved telemetry data is transmitted to data center DPC.

In accordance with an aspect of my invention, as further discussed below, communication lines having sensors thereon are connected to the communication switching center through the telemetry center which controls the connection of the line to the communication center of the test circuit.

If the test information indicates that the designated line is a dedicated monitoring line, such as the lines attached to terminals CP4-7, rather than a working communication line, telemetry center TSC does not first ascertain the status of the line prior to retrieving telemetry data. Rather, telemetry center TSC either immediately completes a telemetry path from the line to another test circuit or actuates apparatus continuously monitoring a sensor attached to the line. This test circuit retrieves telemetry data over the line in accordance with the testing information. Upon completion of this interrogation, the designated line is returned to its normal status and the retrieved telemetry data is conveyed to data center DPC.

PROVISION OF COMMUNICATION SERVICE

As previously mentioned, communication switching center CSC depicted in FIG. 1 provides normal communication service to station sets ST1-3. These station sets are representative of the many types of functionally diverse communication devices served by communication center CSC. In this illustrative embodiment, this communication service is provided via a two-wire path between communication center CSC and each of the station sets ST1-3. These paths are not routed directly from communication center CSC to the station sets, but rather are routed via main distributing frame MDF which is a connection interface. Frame MDF comprises means for connecting the lines attached to line terminals CP1-7 to either network terminals L2-3 serving communication center CSC, or network terminals M1-6 and M11-12 serving telemetry center TSC.

Frame MDF also comprises means for interconnecting terminals L1-3 to terminals M1-2. As is well known in the art, these connections and cross-connections are established either by physical wire paths or by switch means within the frame.

Station set ST1 is linked to communication center CSC via the line terminating on terminal CP1, cross-connection CC1, and the wire pair terminating on terminal L1. The gathering of telemetry data does not affect the operation of this station since its line appearance is not accessible by telemetry center TSC.

Station sets ST2 and ST3 also have two-wire communication paths to communication center CSC. However, unlike the path serving station set ST1, these paths are indirect routes through telemetry center TSC to communication CSC. As hereinafter described, telemetry center TSC can access the lines serving these sets.

The communication path from station set ST2 to communication center CSC is established via the following route: the line terminating on terminal CP2, cross-connection CC2, the wire pair terminating on terminal M11, break contact S2-2 of relay S2, the wire pair terminating on terminal M1, cross-connection CC5, and the wire pair terminating on terminal L3. The path from station set ST3 to communication center CSC follows a corresponding route through telemetry center TSC. From the vantage point of communication center CSC, station sets ST2-3 appear as every other station even though the communication paths to these stations assume indirect routes through telemetry center TSC.

The lines attached to terminals CP4-7 are dedicated monitoring lines having only sensors attached thereto. These lines do not provide communication service to subscriber sets and are not accessible by communication center CSC.

PROVISION OF TELEMETRY SERVICE

This illustrative embodiment of my invention depicts a cable pressure telemetry system in which three basic types of sensors are described. Each of these types is designed to perform a different surveillance function.

The first type of sensor, as exemplified by sensors SEN1-2, is attached to working lines such as those connected to terminals CP2-3. The function of each of these first type of sensors is to measure and indicate the gas pressure within a cable sheath without interfering with normal communication service provided over the communication line to which the sensor is connected. This cable sheath houses a plurality of communication lines, one of which is the line to which the sensor is connected.

Each of these sensors comprises a bellows arrangement which, in response to pressure changes, moves a contact to vary the value of a resistor bridged across the communication line. Typically, the contact movement varies the resistance value between 100 K ohms and 1 M ohms in response to the measured pressure. Since the value of the bridged resistance is extremely high in relation to the normal loop resistance of the line, the sensor does not interfere with the conveyance of data and and voice signals over the line.

The second type of sensor is an alarm device normally used to monitor the status of equipment used in a pressurized cable system. When a malfunction is detected, this sensor goes from a quiescent open state to an alarm state in which it short-circuits the line to which it is connected. A plurality of these sensors can be attached to the same monitoring line since it is highly unlikely that two sensors will simultaneously detect malfunctions.

Since short-circuiting of a line is not compatible with the provision of communication service thereover, these sensors are usually attached only to dedicated monitoring lines rather than working communication lines. Sensors of this second type are typically attached to physically distinct portions of a single monitoring line. When a short circuit is detected over the monitoring line, a simple loop resistance test can then be performed to pinpoint the specific sensor which has caused the short circuit. Sensors SEN3-7 are of the above-described second type.

The third type of sensor, as exemplified by sensors SEN8-9, is a flowmeter which measures the rate of change or flow of a monitored parameter. This sensor conveys this information by short-circuiting the line to which it is attached at a frequency proportional to the rate of change of monitored parameter. Typically, sensors of this third type are used to monitor the rate at which a gas, such as nitrogen or dry air, is supplied from a reservoir into a cable sheath.

Three test circuits are provided for interrogating the three above-described types of sensors. Cable pressure test circuit CPTC comprises means for interrogating and retrieving data from all the sensors of the first type. As previously discussed, these sensors indicate a cable pressure by varying the value of a resistance bridged across working communication lines. Since a resistance measurement can not be effected while a line is being used to provide communication service, cable test circuit CPTC performs a noninterfering test to determine the busy or idle status of an accessed communication line prior to performing a resistance measurement.

A line is defined to be in a busy status either if the communication station attached to the line is off-hook or if ringing current is being supplied over the line to the communication station. A line, similarly, is defined to be in an idle status if it is not in a busy status. Upon ascertaining that an accessed line is busy, cable pressure test circuit CPTC generates a busy indication which, as hereinafter described, is conveyed to data center DPC. In contrast, if the accessed line is idle, test circuit CPTC disconnects the line from communication center CSC and connects the line to a measurement circuit which measures the value of the resistor bridge across this line. An analog signal specifying this value is conveyed to a converter which converts the signal into a digital format for conveyance to data center DPC.

Alarm test circuit ATC comprises means for interrogating all the sensors of the second type. This circuit includes apparatus for detecting if an accessed line is short-circuited. A short circuit indicates that one of the alarm sensors attached to the line has detected a malfunction. When a short circuit is detected, a loop resistance measurement is then made in compliance with further control information from data center DPC to pinpoint the specific alarm sensor which has short-circuited the line. This resistance measurement is conveyed as an analog signal to a converter which generates the digital representation of the analog signal. This digital representation is transmitted to data center DPC.

All sensors of the third type are interrogated by counter circuit CTC. This circuit comprises a plurality of counters, each permanently connected to a dedicated monitoring line serving a single flowmeter. Each counter detects and stores the number of times its monitoring line is short-circuited.

Telemetry paths from test circuits CPTC and ATC to the sensors SEN1-7 are established by telemetry switching center TSC in response to data words received over data link AL from data center DPC. Telemetry center TSC also obtains the present count in the counters of test circuit CTC in response to certain of these data words. Each of these data words is received by test controller TC which comprises buffer, control and formating apparatus. Test controller TC temporarily stores each data word in an input buffer and decatenates this word to derive the physical lines address and testing information from the word.

As previously mentioned, the physical line address uniquely and permanently identifies the single line attached to the terminal CP1-7 to which access is requested. The testing information uniquely specifies the type of interrogation to be performed over the line and serves to selectively activate circuits within the test circuits. The type of interrogation required is determined largely by which type of sensor is connected to the line identified by the physical line address. Upon performing the decatenation operation, test controller TC conveys the physical line address via cable B1 to decoder DEC1.

Decoder DEC1 translates the received line address which identifies one of the lines connected to terminals CP2-7. If the received line address identifies one of the lines connected to terminals CP2-5, decoder DEC1 activates the single relay S2-S5 respectively corresponding to the identified line terminal CP2-5. The actuated relay operates a correspondingly numbered set of relay contacts. Each of the contacts depicted in the drawings represents two physical contacts of the same type, and each of the two physical contacts is associated with one wire of a wire pair. Contacts S2-1, S2-3 and contacts S3-1, S3-3, when operated, respectively connect the lines attached to terminals CP2 and CP3 to cable pressure test circuit CPTC. As hereinafter described, even after one of these lines is cut through to test circuit CPTC, the communication service provided thereover is not interfered with. A communication path from the line to communication center CSC remains intact, via a common bypass path associated with cable pressure test circuit CPTC, until it is ascertained the line is idle. Contacts S2-2 and S3-2, when operated, open the normal communication path and permit the bypass path to maintain the communication path. Contacts S4-1 and S5-1, respectively, connect the lines attached to terminals CP4 and CP5 to alarm test circuit ATC.

A timed latching circuit in decoder DEC1 supervises the actuated relay and keeps the relay in an operated state until a predetermined time after actuation. At this predetermined time, the relay is automatically released thereby disconnecting the accessed line from the test circuit and returning the line to its normal status.

If the received line address identifies one of the lines attached to terminals CP6-7, decoder DEC1 selectively activates the specific counters in counter test circuit CTC monitoring the identified line. In response to an activation signal from decoder DEC1 received over cable G1, the actuated counter conveys its present count information to data center DPC, as hereinafter explained.

Test controller TC also conveys the testing information of each received data word to test circuits CPTC and ATC. This information is sent over cable F1 and, as hereinafter explained, functions to activate specific circuits in these test circuits to perform the designated interrogation test.

When one of the test circuits CPTC or ATC is activated in response to the received testing information or test circuit CTC is activated in response to an activation signal from decoder DEC1, the activated test circuit performs the specified interrogation test over the previously established telemetry path to the designated line. Upon completion of this interrogation, the activated test circuit conveys the retrieved telemetry data in a digital format via one of the cables A1-3. This digital data is received by data selection circuit DSC which comprises means responsive to the testing information conveyed over cable F1 for selecting the leads in the single cable A1-3 over which the retrieved telemetry data is conveyed.

This digital data is further conveyed from data circuit DSC to format circuit BFC. Format circuit BFC comprises an output buffer for temporarily storing the data and coding means for placing the digital data in an output word format suitable for transmission. This output word is conveyed to test controller TC which performs parity checks prior to conveying the word via data link RL to data center DPC.

In accordance with its stored program, data center DPC ascertains if the retrieved telemetry data is within predetermined allowable limits. When data center DPC determines that a malfunction or abnormal situation has developed, it outputs this information to inform a craftsman of the specific difficulty. Data center DPC can be programmed to interrogate sensors SEN1-9 in any order and at a frequency desired in order to maximize the efficiency of the surveillance function.

DETAILED DESCRIPTION OF THE TEST CIRCUITS

Figure 2:
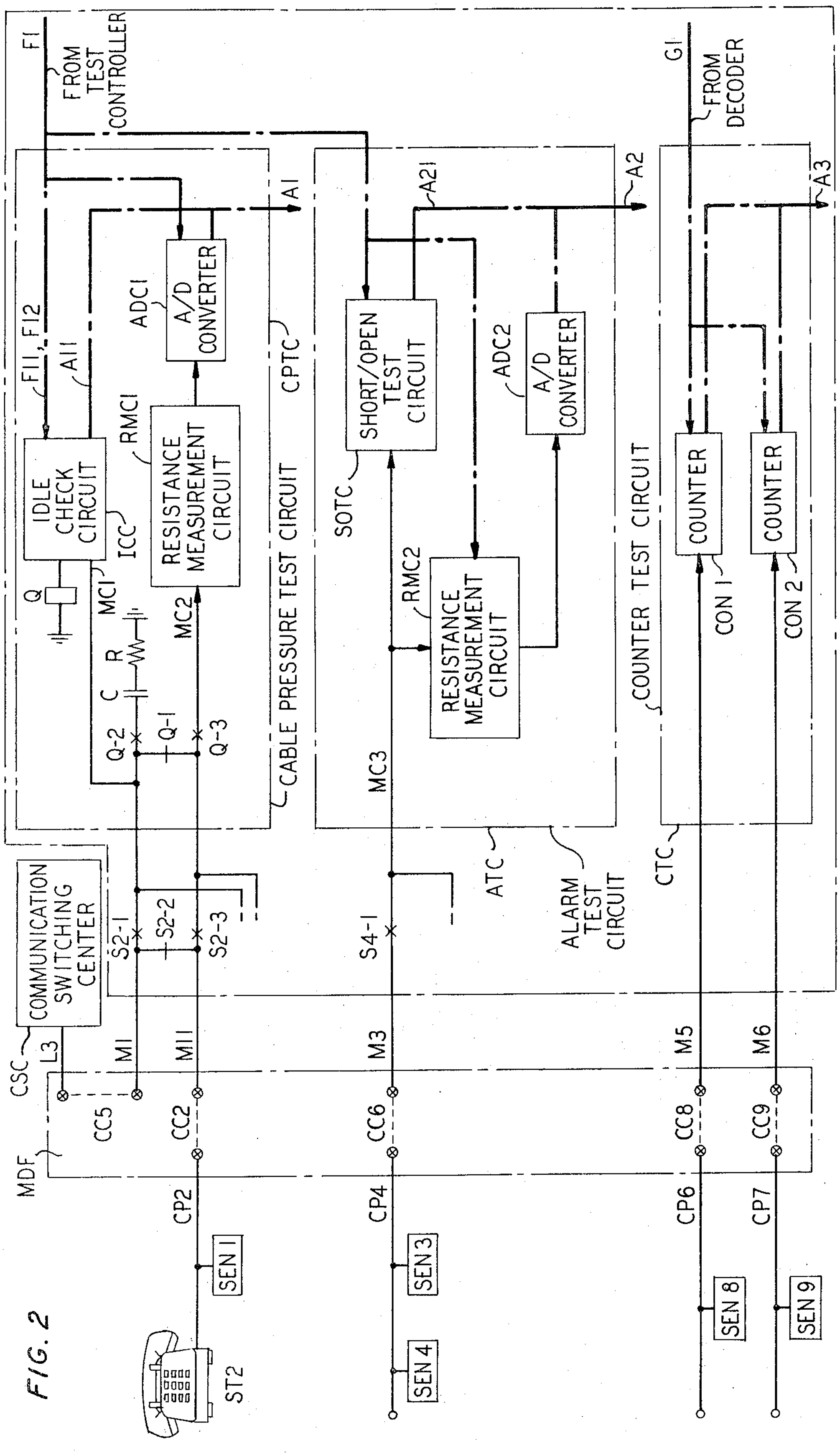
FIG. 2 shows in greater detail the cable pressure test circuit, the alarm test circuit, and the counter test circuit depicted in FIG. 1.

FIG. 2 illustrates in greater detail the composite elements of each of the previously described test circuits of FIG. 1. Each of the elements depicted in FIG. 2 corresponds to its similarly designated counterpart of FIG. 1.

The function of cable pressure test circuit CPTC is to retrieve telemetry data from cable pressure sensors SEN1-2 attached respectively to the lines attached to terminals CP2-3. Since these lines are also utilized for the provision of normal communication service to stations ST2-3, this test circuit must perform its interrogation function without interfering with the service provided these station sets.

Before circuit CPTC can perform its interrogation function, the circuit must first have access to a line via bypass wire pairs MC1 and MC2 which are common to many lines. As previously described, a line is accessible only after decoder DEC1 selectively actuates the relay associated therewith in response to physical line address information identifying the line. Even after circuit CPTC is afforded access to a line, normal communication service can be provided over the line since a bypass communication path from the line to communication center CSC remains intact via contact Q-1. This contact is opened to disconnect the line from center CSC only after it is determined that the line is idle.

Specifically, in response to testing information from test controller TC received over cable F1, idle check circuit ICC determines whether the accessed line is in an idle or busy state. If the accessed line is busy, idle check circuit ICC conveys a busy indication via lead A11 of cable A1 to data selection circuit DSC. This busy indication is conveyed via data selection circuit DSC, format circuit BFC, and test controller TC to data center DPC.

If the accessed line is idle, idle check circuit ICC actuates relay Q. This operates relay contacts Q-1, Q-2, Q-3 which (1) disconnect communication center CSC from the accessed line; (2) terminate the line's appearance in communication center CSC on capacitor C and resistor R; and (3) establish a telemetry path from resistance measurement circuit RMC1 to the line. From the vantage point of communication center CSC, the line appears in a normal idle line condition since resistor R and capacitor C simulate a regular ringer in a station set. If communication center CSC attempts to apply ringing current over the accessed line while the line is connected to measurement circuit RMC1, the current is not applied over the line but rather is applied to resistor R and capacitor C. The diversion of ringing current does not adversely affect the communication service provided over the line since the line is returned to its normal line condition within such a short interval that typically only one ringing cycle is interrupted.

Resistance measurement circuit RMC1 measures the resistance value of the bridged resistor in the accessed sensor. This resistance value is conveyed as an analog signal to A/D converter ADC1. This converter generates the digital equivalent of the analog signal and conveys it over cable A1 to data selection circuit DSC.

As an illustrative example, we will now consider how cable pressure test circuit CPTC interrogates sensor SEN1. For the purpose of this discussion, it is assumed that decoder DEC1 of FIG. 1 has previously actuated relay S2. Contacts S2-1, S2-2, and S2-3 are therefore operated and circuit CPTC has access to the line attached to terminal CP2 via wire pairs MC1-2. This line is still connected to center CSC via contact Q-1. Idle check circuit ICC is activated in response to testing information received over cable F1 and ascertains the status of the line attached to terminal CP2. If this line is busy, idle check circuit ICC conveys a busy indication over lead A11 and does not activate relay Q. The line will be released when the timing circuit in decoder DEC1 releases relay S2 thereby returning the line to its normal status.

However, if the line is idle, idle check circuit ICC actuates relay Q. Relay contacts Q-1, Q-2, Q-3 then operate and split the path from communication center CSC to the line. Sensor SEN1 is connected to resistance measurement circuit RMC1 via the following path: the line terminating on terminal CP2, cross connection CC2, the wire pair terminating on terminal M11, make contacts S2-3, make contacts Q-3 and wire pair MC2. Resistance measurement circuit RMC 1 measures the value of the bridged resistor in sensor SEN1 over the above-described path. An analog signal representing this resistance value is conveyed to A/D converter ADC1 which further conveys this value in a digital form to data selection circuit DSC via the cable A1. Decoder DEC1 releases relay S2 after the previously mentioned predetermined interval thereby disconnecting the accessed line from test circuit CPTC.

Alarm test circuit ATC comprises means for determining the status of the alarm sensors attached to the monitoring lines attached to terminals CP4-5. To facilitate an understanding of the operation of this circuit, we will consider an illustrative example in which this circuit interrogates alarm sensors SEN3-4 attached to the monitoring line attached to terminal CP4. In this discussion, it will be assumed that relay contacts S4-1 have operated thereby connecting alarm test circuit ATC to this monitoring line.

Alarm test circuit ATC initiates the interrogation of sensors SEN3-4 in response to an activating signal specified by the testing information received over cable F1. In response to this signal, short/open test circuit SOTC, which comprises resistance measuring means, ascertains whether line CP4 is short or open-circuited. This determination is made over the following path: wire pair MC3, contacts S4-1, the wire pair terminating on terminal M3, cross connection CC6, and the line terminating on terminal CP4. Circuit SOTC sends over lead A21 of cable A2 a binary indication specifying the lines' short-circuited or open-circuited status.

As previously discussed, this indication is conveyed to data center DPC. Upon reception of a short-circuit indication, data center DPC, realizing that a malfunction has been detected, conveys another data word to test controller TC. This data word in addition to specifying a physical line address identifying the line terminating or terminal CP4, also contains testing information specifying that a loop-resistance measurement is to be made by alarm test circuit ATC. This testing information is conveyed from test controller TC via cable F1 to resistance measurement circuit RMC2. It is assumed at this point that the physical line address has actuated relay S4 thereby cutting through the line terminating on terminal CP4 to alarm test circuit ATC for the second time. Circuit RMC2, upon being activated by the testing information received over cable F1, measures the loop resistance of the line terminating on terminal CP4. An analog representation of this resistance is conveyed to A/D converter ADC2 for digital conversion and subsequent conveyance to data selection circuit DSC via cable A2. Relay S4 is released by decoder DEC1 after the predetermined time interval thereby disconnecting the accessed line from test circuit ATC.

The function of counter test circuit CTC is to continuously monitor flowmeter sensors SEN8-9. Sensors SEN8 and SEN9 are respectively connected to counters CON1 and CON2 each of which count the number of times a short-circuit is generated by their associated sensor. This count is proportional to the rate at which a monitored parameter is supplied.

In response to activation signals from decoder DEC1 received over cable G1, counter test circuit CTC conveys the present count information in an identified counter CON1-2 to data selection circuit DSC via cable A3. As previously discussed, this present count information is placed in a format suitable for transmission and subsequently conveyed to data center DPC.

IDLE CHECK CIRCUIT

Figure 3:
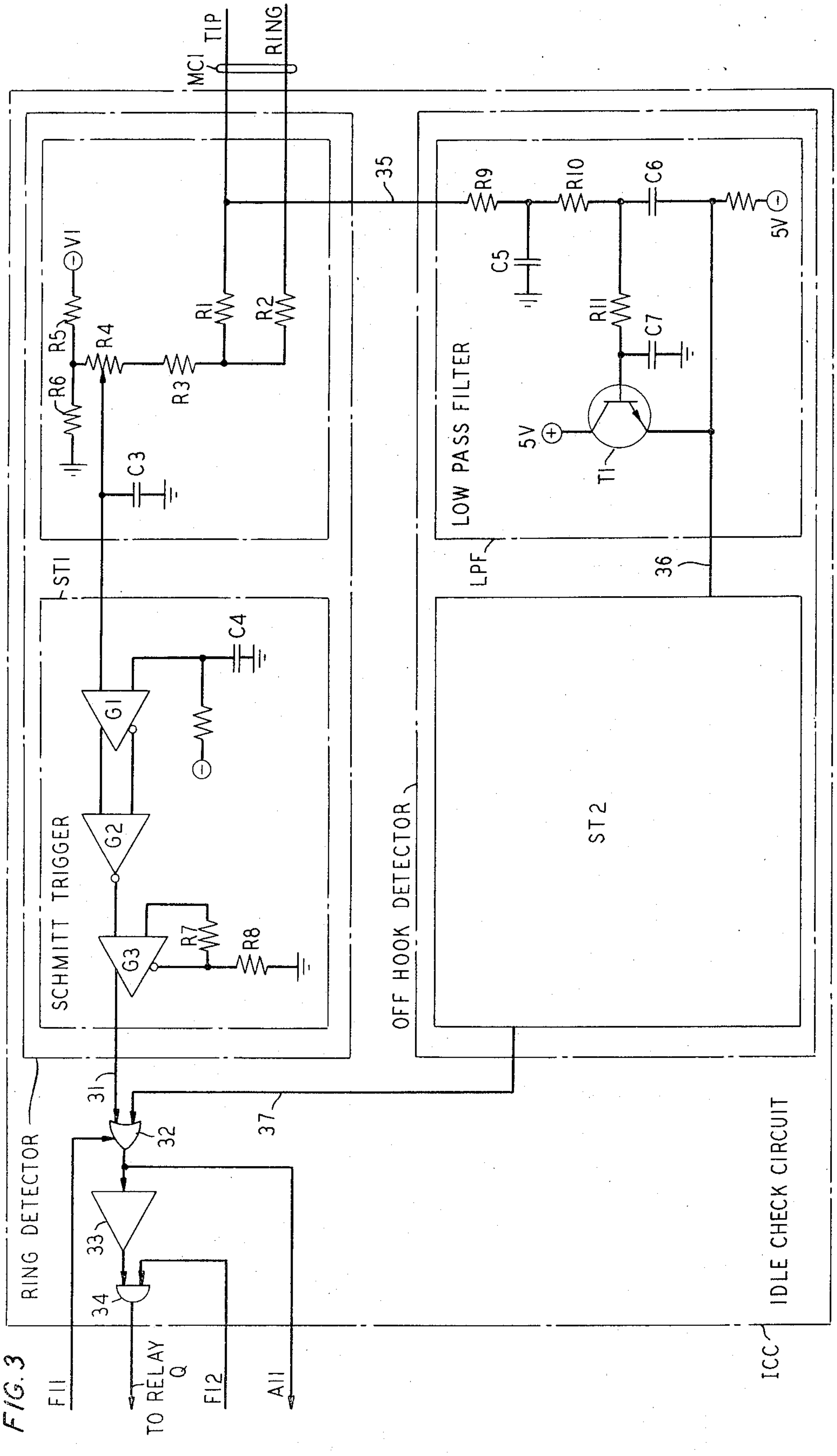
FIG. 3 is a schematic diagram of the circuitry in the idle check circuit of FIG. 2.

FIG. 3 illustrates in detail the circuitry of idle check circuit ICC which was described in regard to FIG. 2.

The function of idle check circuit ICC is to ascertain the busy or idle status of each of working communication lines attached to terminals CP2-3 when they are selectively connected to cable pressure test circuit CPTC.

Idle check circuit ICC comprises a ring detector for detecting periods of application of alerting signals to the station set connected to the accessed line, and an off-hook detector for determining if the station set is on or off-hook.

The ring detector is connected to the accessed line via the tip and ring leads of wire pair MC1. The network comprising resistors R1-3 combines any ringing signals being applied over the tip or ring leads, or both, and applies the ringing or composite ringing signal to resistor R4. In a typical application, ringing signals are applied by communication center CSC to either the tip or ring leads. The composite signal is biased and filtered by resistors R5-6, voltage source V1, and capacitor C3. The resultant signal is applied to Schmitt trigger ST1. Schmitt trigger ST1 is a well-known electronic device which, upon detecting an analog signal of a predetermined threshold, generates a pulse of a predetermined width and amplitude. Schmitt trigger ST1 determines if a ringing signal is presently being supplied over the line by monitoring the resultant signal on resistor R4. If a ringing signal is being applied the resultant signal will be above a prescribed threshold and Schmitt trigger ST1 will generate a pulse over lead 31 to OR gate 32. When strobed by an activation signal received over lead F11 of cable F1, this gate produces a positive output signal which is conveyed via lead A11 to indicate the busy status of the accessed line. If the ring detector makes its determination during the silent (i.e., no-current) period of the ringing cycle, the line will be accessed and the ringing current temporarily interrupted.

The off-hook detector comprises lowpass filter LPF and Schmitt trigger ST2. As is well known in the art, if a station set if off-hook, battery will be supplied by communication center CSC to the set via the ring lead and through the set to the tip lead. The presence of this battery on the tip lead is detected by the off-hook detector.

Specifically, any signals conveyed over the tip lead are directed to lowpass filter LPF via lead 35. Filter LPF comprises well-known 2-port circuitry for filtering out the higher frequency a.c. components of a signal, and for outputting substantially a d.c. signal. This d.c. signal is conveyed to Schmitt trigger ST2 via lead 36. If this signal is above a predetermined threshold thereby indicating the presence of battery on the tip lead, Schmitt trigger ST2 generates a positive pulse over lead 37. OR gate 32, in response to this pulse and a strobe signal received over lead F11, outputs a positive pulse via lead A11 to indicate the busy status of the accessed line.

Thus a busy indication is generated if either the station set is off-hook or ringing circuit is supplied to the station set.

If the accessed line is idle, the ring detector and off-hook detector will so indicate by applying negative signals via their respective leads 31 and 37. The output from OR gate 32 will also be negative, and inverter gate 33 will apply a positive signal to AND gate 34. Upon reception of a positive activation signal over lead F12 of cable F1 from test controller TC, AND gate 34 will generate a positive output thereby activating relay Q which cuts through the accessed line to resistance measurement circuit RMC1 and disconnects this line from communication center CSC. This activation signal is of sufficient duration to allow time for circuit RMC1 to perform a resistance measurement.

The above-described arrangement is merely an illustrative application of the principles of my invention. Numerous other arrangements pertaining to other telemetry applications and switching networks may be devised by those skilled in the art without departing from the spirit and scope of my invention.

What is claimed is:

1. In combination,
   - a communication line having a communication station and a first sensor attached thereto,
   - a communication switching center connected to said line for establishing a communication connection over said line to said station in accordance with station address information identifying said station,
   - a source of first line address information identifying said line, and
   - switching means connected to said line for establishing a first telemetry connection over said line to said first sensor in accordance with received first line address information.

2. The combination of claim 1 wherein,
   - said communication center comprises means for applying periodic alerting signals over said line to said station,
   - and the combination further comprises
   - means for disconnecting said line from said communication center,
   - first detecting means for detecting the application of said alerting signals to said line,
   - second detecting means for detecting the on-hook or off-hook state of said station, and
   - inhibiting means responsive to said second detecting means for inhibiting said disconnecting means when said station is off-hook, and responsive to said first detecting means for inhibiting said disconnecting means during periods of application of said alerting signals to said station.

3. The combination of claim 2 wherein
   - said source comprises data processing means,
   - and the combination further comprises means responsive to said first and second detecting means for conveying a busy indication to said processing means.

4. The combination of claim 1 wherein,
   - said source comprises data processing means,
   - and the combination further comprises
   - interrogation means connected to said switching means for retrieving information from said first sensor over said first telemetry connection, and
   - means for conveying said retrieved information to said processing means.

5. The combination of claim 1 further comprising
   - a monitoring line connected only to said switching means and having a second sensor attached thereto, and wherein said source further provides second line address information identifying said monitoring line, and said switching means further comprises means for establishing a second telemetry connection over said monitoring line to said second sensor in accordance with received second line address information.

6. The combination of claim 5 wherein said second line address information specifies second testing information associated with said second sensor, said first line address information specifies first testing information associated with said first sensor, said source comprises data processing means, and the combination further comprises first interrogation means connected to said switching means for retrieving information from said first sensor over said first telemetry connection in accordance with said first testing information, second interrogation means connected to said switching means for retrieving information from said second sensor over said second telemetry connection in accordance with said second testing information, and means for conveying said retrieved information to said processing means.

7. The combination of claim 6 wherein said first sensor comprises a pressure sensitive device for indicating the amount of pressure within a cable sheath containing said communication line and a plurality of other communication lines, said second sensor comprises an alarm device for indicating a malfunction, said first testing information specifies that said first sensor is a pressure sensitive device, and said second testing information specifies that said second sensor is an alarm device.

8. In combination, a plurality of lines each having a plurality of functionally diverse devices attached thereto, a source of first device address codes each defining one of said devices of a first functional class, a source of second line address codes each uniquely defining one of said lines, first switching means connected to said lines and controllable in accordance with a received first device address code for establishing a first connection to the one device defined thereby over the line to which said one device is connected, means for performing a first function in cooperation with said one device over said first connection, second switching means connected to said lines and controllable in accordance with a received second line address code for establishing a second connection to said line and for disconnecting said line from said first switching means, and means for performing a second function over said second connection in cooperation with another of said devices connected to said line.

9. A telemetry and communication arrangement comprising a plurality of communication lines each having a communication station attached thereto, certain of said lines also having a telemetry device connected thereto, a source of station address codes each defining one of said communication stations, a source of line address codes each defining one of said certain lines, a communication switching center connected to said plurality of communication lines and responsive to a received station address code for establishing a communication connection to the station defined thereby over the line to which said station is connected, switching means separate from said switching center and responsive to a received line address code defining said line for establishing a telemetry connection over said line to the telemetry device connected to said line, and means for disconnecting said line from said switching center.

10. The combination of claim 9 further comprising first detecting means for detecting the on-hook or off-hook status of said station, second detecting means for detecting the application of periodic alerting signals to said station, inhibiting means responsive to said first and said second detecting means for inhibiting said disconnecting means when said station is off-hook and during periods of application of said alerting signals, and telemetry means connected to said switching means for cooperating with said telemetry device over said telemetry connection.

11. The combination of claim 9 further comprising a plurality of monitoring lines each having at least one telemetry device attached thereto and each connected only to said separate switching means, and wherein said line address codes include codes each defining one of said monitoring lines, and said separate switching means is responsive to a received line address code for establishing a telemetry connection over the monitoring line defined thereby to the at least one telemetry device attached thereto.

12. An arrangement for telemetering and communicating over telephone lines which comprises a plurality of telephone lines each having a telephone station connected thereto, a source of station address codes each uniquely defining one of said stations, certain of said telephone lines each having a cable pressure sensing device attached thereto for indicating the pressure in the sheath housing the line to which said pressure sensing device is attached, a source of line address codes each uniquely defining one of said certain telephone lines and specifying testing information associated with the cable pressure sensing device attached to said one certain telephone line, a plurality of first monitoring lines each having at least one alarm sensor attached thereto, wherein said line address codes further include codes each uniquely defining one of said first monitoring lines and specifying testing information associated with the at least one alarm sensor attached to said one first monitoring line, a plurality of second monitoring lines each having a flowmeter attached thereto, wherein said line address codes further include codes each uniquely defining one of said second monitoring lines, and specifying testing information associated with the flowmeter attached to said one second monitoring line, a telephone switching office connected to said telephone lines and responsive to a received station address code for establishing a communication connection to the station defined thereby over the telephone line to which said defined station is connected, a telemetry switching center connected to said certain telephone lines and said first and second monitoring lines, and responsive to a received line address code for establishing a telemetry connection for the line defined thereby and when one of said certain telephone lines is defined for disconnecting said defined certain telephone line from said telephone switching office, test circuit means connected to said telemetry center for retrieving data over said telemetry connection in accordance with the testing information specified by said received line address code, detecting means responsive to a received line address code defining one of said certain telephone lines for detecting over said telemetry connection if the station connected to said one defined certain line is off-hook and further detecting if a periodic alerting signal is being applied to said station connected to said one defined certain telephone line, and inhibiting means responsive to said detecting means for inhibiting said telemetry switching center from disconnecting said defined certain telephone line if said station connected to said one defined certain telephone line is off-hook or if a periodic alerting signal is being applied to said station connected to said one defined certain telephone line.

13. In a switching system having a plurality of communication lines, a switching center, a plurality of communication paths each interconnecting one of said lines and said switching center, an arrangement for permitting telemetering and communicating over the same lines comprising a test circuit, terminating means for simulating a communication line condition, means responsive to a line address and to the idle condition of said addressed line for splitting the interconnection path between said addressed line and said center, for connecting one end of said split path to said test circuit and for connecting the other end of said split path to said terminating means.

14. In a switching system having a plurality of communication lines, a switching center, a plurality of communication paths each interconnecting one of said lines and said switching center, an arrangement for permitting telemetering and communicating over the same lines comprising a source of line addresses, first switch means responsive to a received line address for splitting the communication path interconnecting said addressed line and said center, second switch means common to a plurality of lines for connecting the ends of said split communication path via a bypass path, circuit means for detecting the idle state of said addressed line via said bypass path, terminating means for simulating an idle communication line condition, a test circuit, and said second switch means further comprising means responsive to said circuit means for splitting said bypass path, for connecting one end of said split bypass path to said test circuit to permit telemetering over said addressed line, and for connecting the other end of said split bypass path to said terminating means.

15. In a switching system having a plurality of communication lines, a switching center and a main distributing frame for interconnecting the communication lines and the switching center, an arrangement for permitting telemetering and communicating over the same lines comprising loop means having two terminations on the main distributing frame, the first of said terminations connectable through the main distributing frame to one of said lines and the second of said terminations connectable through the main distributing frame to the switching center, telemetry test means, terminating means for simulating an idle communication line condition, and means responsive to a line address from said test means and to the idle condition of said addressed line for opening said loop means, for connecting said first loop termination to said test means and for connecting said second loop termination to said terminating means.

16. The combination according to claim 1 wherein said switching means further comprises means for disconnecting said line from said communication switching center;

means for connecting said line to a telemetry circuit to permit ascertaining the status of said attached first sensor, and means for connecting terminating means to said communication switching center to simulate an idle condition for said line.

* * * * *